(12) United States Patent
Schulz-Harder

(10) Patent No.: US 7,299,967 B2
(45) Date of Patent: Nov. 27, 2007

(54) METHOD FOR MANUFACTURING PLATE STACKS, PARTICULARLY COOLERS OR COOLER ELEMENTS MADE UP OF PLATE STACKS

(75) Inventor: Jurgen Schulz-Harder, Lauf (DE)

(73) Assignee: Electrovac AG, Klosterneuberg (AT)

( * ) Notice: Subject to any disclaimer, the term of this patent is extended or adjusted under 35 U.S.C. 154(b) by 213 days.

(21) Appl. No.: 11/028,213

(22) Filed: Jan. 4, 2005

(65) Prior Publication Data
US 2005/0150935 A1    Jul. 14, 2005

(30) Foreign Application Priority Data
Jan. 12, 2004  (DE) .................. 10 2004 001 772
Jan. 17, 2004  (DE) .................. 10 2004 002 494
Jan. 19, 2004  (DE) .................. 10 2004 002 841

(51) Int. Cl.
*B23K 31/02* (2006.01)
*B21D 53/02* (2006.01)
*B21D 39/06* (2006.01)

(52) U.S. Cl. .................. 228/183; 228/193; 29/890.03; 29/890.039; 29/890.043

(58) Field of Classification Search ............ None
See application file for complete search history.

(56) References Cited

U.S. PATENT DOCUMENTS

| | | | | |
|---|---|---|---|---|
| 3,437,965 | A * | 4/1969 | Ragsdale | 336/61 |
| 4,358,923 | A * | 11/1982 | Feldstein | 57/401 |
| 4,508,256 | A * | 4/1985 | Radel et al. | 228/152 |
| 4,807,342 | A * | 2/1989 | Lapeyre | 29/890.03 |
| 5,644,840 | A * | 7/1997 | Hisamori et al. | 29/890.043 |
| 5,835,345 | A * | 11/1998 | Staskus et al. | 361/699 |
| 6,220,497 | B1 * | 4/2001 | Benz et al. | 228/118 |
| 6,677,054 | B1 * | 1/2004 | Hermann et al. | 428/636 |
| 6,959,492 | B1 * | 11/2005 | Matsumoto et al. | 29/890.039 |
| 2003/0196451 | A1 * | 10/2003 | Goldman et al. | 62/515 |
| 2003/0227764 | A1 * | 12/2003 | Korczynski | 361/826 |
| 2004/0099712 | A1 * | 5/2004 | Tonkovich et al. | 228/193 |
| 2006/0225283 | A1 * | 10/2006 | Rissler et al. | 29/890.041 |

* cited by examiner

*Primary Examiner*—Kevin Kerns
(74) *Attorney, Agent, or Firm*—Hoffman, Wasson & Gitler

(57) ABSTRACT

The invention relates to an innovative method for manufacturing plate stacks, particularly for manufacturing coolers or cooler elements or heat sinks at least one plate stack, with at least two plate-shaped elements made of metal, for example copper, and provided with passages or openings, wherein the stacked elements are joined with each other using bonding on joining surfaces formed by surface sides of said elements by heating to a process temperature to form the stack.

5 Claims, 6 Drawing Sheets

METHOD FOR MANUFACTURING PLATE STACKS, PARTICULARLY COOLERS OR COOLER ELEMENTS MADE UP OF PLATE STACKS

BACKGROUND OF THE INVENTION

The invention relates to a method for making or manufacturing plate stacks, particularly for manufacturing or producing coolers, cooler elements or heat sinks. The coolers, cooler elements or heat sinks are made up of at least one plate stack, with at least two plate-shaped elements made of metal, for example copper. They are provided with passages or openings and wherein the stacked elements are bonded with each other using a bonding means on joining surfaces formed by surface sides of said elements by means of heating to a process temperature to form the stack.

Coolers, also known as micro-coolers, are known in the art for cooling electrical components or modules, particularly high-power components or modules. The coolers consist of thin metal (metal foil) plates joined with each other to form a stack, the inner plates being structured, i.e. provided with openings or passages, so as to form cooling channels or flow paths for a coolant in the interior of the plate stack or cooler. For surface joining of the plates, they are provided with a joining means on their joining surfaces, i.e. on their surface sides. In order to join or connect the plates, the latter are stacked one on top of the other in a stack and then heated to a suitable process temperature, in which a fusible metal area (joining or hot-melt layer) is produced on the joining surfaces using the joining means, so that after cooling of the stacks they are joined with each other to form the plate stack.

The disadvantage of the known method is that contractions, or unwanted hollow or dead spaces, are formed in the interior of this stack at the junction between openings or passages of two adjoining plates during solidification of the joining or hot-melt layer, which (dead spaces) cause unwanted turbulence in the coolant flowing through the cooler formed by the plate stack.

SUMMARY OF THE INVENTION

An object of the invention is to provide for a method that eliminates this disadvantage. This object is achieved by a method for manufacturing plate stacks, particularly for manufacturing coolers or cooler elements or heat sinks consisting of at least one plate stack, with at least two plate-shaped elements made of metal, for example copper, and provided with passages or openings, wherein the stacked elements are bonded with each other using a bonding means on joining surfaces formed by surface sides of said elements by means of heating to a process temperature to form the stack, and wherein before bonding, the bonding means is applied also to inner surfaces of the passages or openings.

BRIEF DESCRIPTION OF THE DRAWINGS

The invention is explained below based on exemplary embodiments with reference to the appended drawings, wherein.

DETAILED DESCRIPTION OF THE INVENTION

Figure 1:
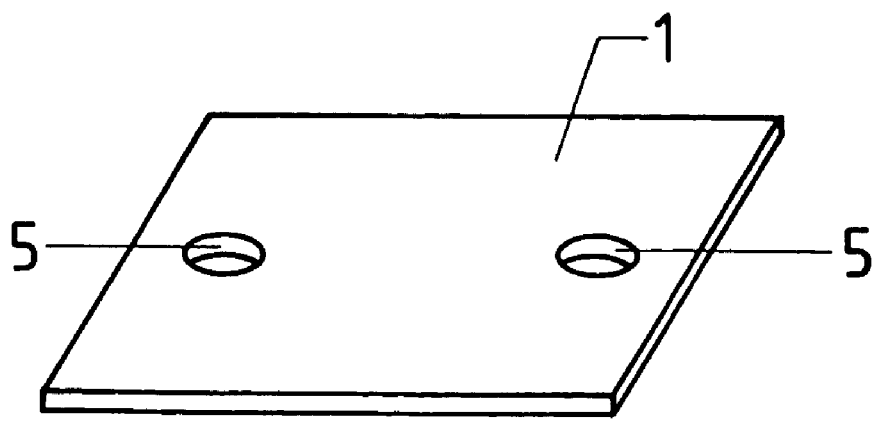
FIG. 1 shows a simplified perspective exploded view of three metal layers or plates of a heat sink or cooler for cooling an electrical component or module not depicted.
Figure 1:
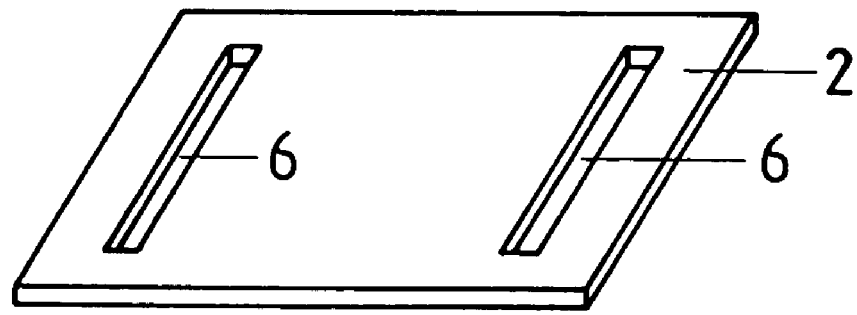
Figure 1:
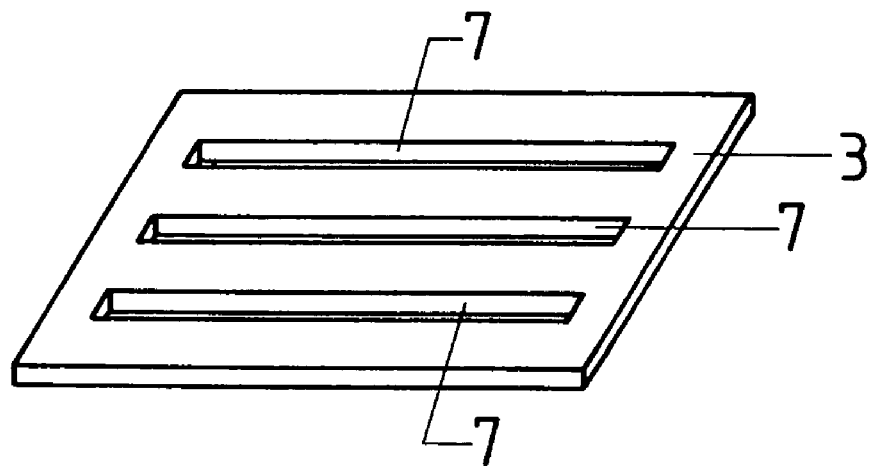
Figure 1:
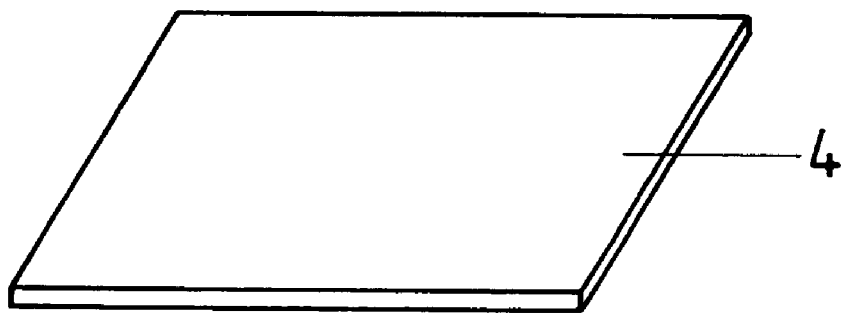

In the drawings, plate-shaped elements, or plates, 1-4, made of metal (for example copper or copper alloy) are joined with each other on the surface to form a stack. This stack forms a cooler, or heat sink, or a part of a cooler or heat sink, for cooling an electrical component not depicted. The plates 1-4 in the depicted embodiment are quadratic blanks of the same size from a metal foil, for example from a copper foil. In order to form a cooler structure, or in order to form cooling channels, through which for example a liquid coolant can flow, the plates 1-3 are structured, i.e. plate 1 is provided with a passage or opening 5 in the proximity of two opposing peripheral sides and approximately in the center of these peripheral sides. Plate 2 has one slit-shaped opening 6 on each corresponding opposing peripheral side which (slit-shaped opening) extends parallel to the respective peripheral side and plate 3 has a plurality of slit-shaped openings 7, which are provided extending parallel to each other and parallel to the two other peripheral sides of the quadratic blank of the plates 1-4. Furthermore, the passages or openings 5-7 are arranged so that when the plates 1-4 are joined with each other to form the cooler, each opening 5 is located congruent with an opening 6, each opening 6 is congruent with one end of the openings 7 and the openings 7 on their side of the plate 3 facing away from the plate 2 are closed by the plate 4.

In this way, the openings 7 form a plurality of parallel cooling channels, each of which is connected at both ends with one distribution channel formed by one opening 6. The distribution channels formed by the openings 6 can be connected with a coolant circuit by means of connections formed by the openings 5.

Figure 2:
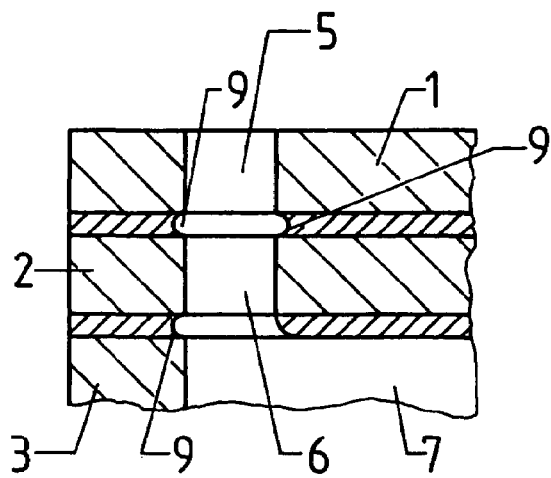
FIG. 2 shows a simplified representation in partial view of a cooler as known in the prior art, manufactured by surface joining or bonding of the plates depicted in FIG. 1.

The plates 1-4 are joined or bonded on the surface with each other to form the plate stack forming the cooler, using a bonding medium or means (coating 8), which is applied to the areas of the surface sides not occupied by the openings 5-7 on the joining surfaces or surface sides of the plates 1-4 that adjoin in the plate stack and which upon bonding by means of heating to a process temperature produces a fusible or melting metal area (bonding or melting layer), so that after cooling the plates 1-4 are joined or bonded with each other to form the plate stack or cooler. The disadvantage of the known art is that after joining, dead spaces 9 are formed in the joining layer in the area of the openings and at the junction between two plates, e.g. due to degeneration or shrinking of the joining or melt or bonding layer during cooling and/or due to insufficient covering with the fusible or melting metal during bonding, as depicted in FIG. 2 in the area of the junction between the plates 1 and 2 in the area of the openings 5 and 6.

These dead spaces 9 have considerable disadvantages, i.e. they cause unwanted turbulence of the coolant flowing through the cooler or the cooling channels. In particular, these dead spaces 9 cause unwanted corrosion, particularly on the edges or margins of the openings 5-7 that are exposed due to the dead spaces 9.

Figure 3:
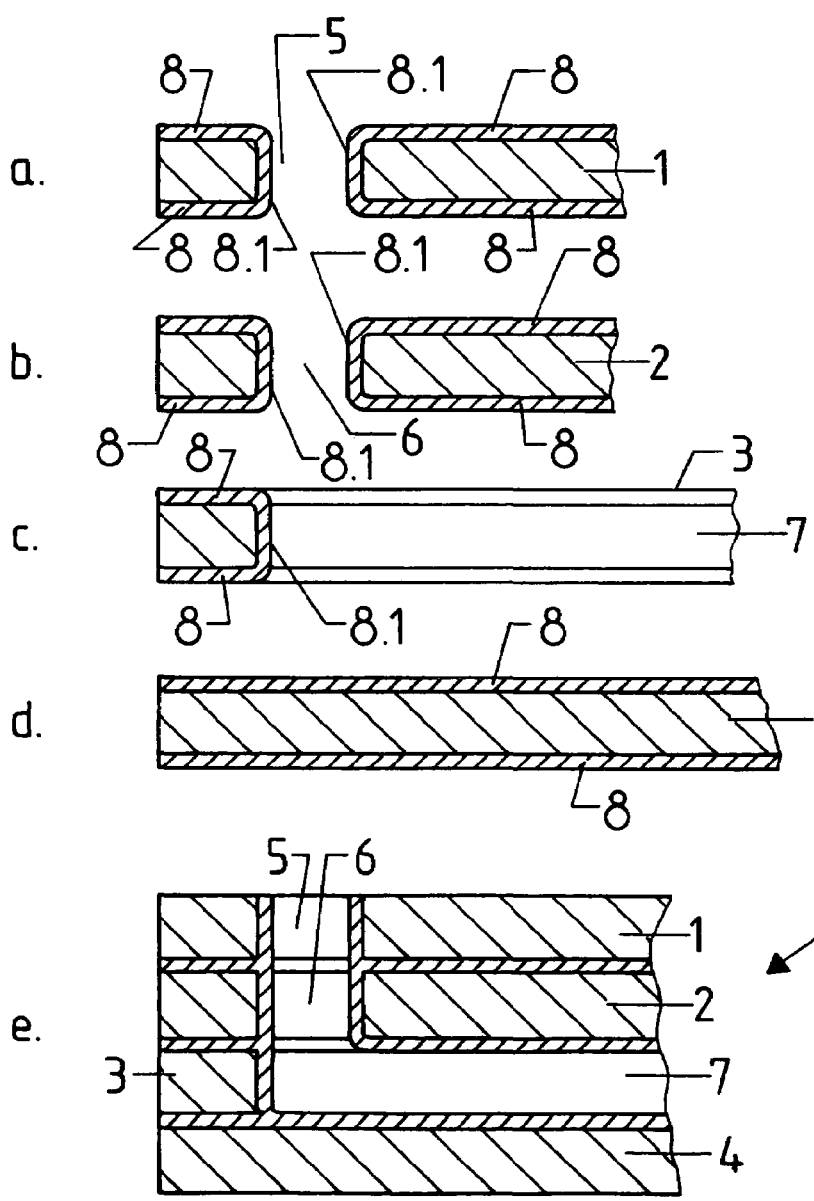
FIG. 3 shows in each of several positions a-d cross sections of the individual plates of a cooler according to the invention before connecting or bonding and in position e a cross section through the cooler.

FIG. 3 shows a first possible embodiment of the invention. In this embodiment, the plates 1-4 are used for manufacturing the plate stack or the cooler 10, however the joining or bonding means is applied before joining of the plates 1-4 so that as a bonding means coating 8, it not only fully covers at least the joining surfaces or the adjoining surface sides of the plates 1-4 in the cooler 10, but also the side or inner surfaces of the passages or openings 5-7 with a sufficient thickness as indicated in the positions a-d of FIG. 3, each having the inner coating 8.1.

After bonding of the plates 1-4 to form the cooler, and taking into consideration the surface tension of the metal that melts during the bonding process, the dead spaces 9 that occur in the known art are eliminated, in particular the surfaces and edges of the channels of the cooler 10 formed by the side surfaces of the openings are covered with the bonding means, as depicted in FIG. 3 in position e for the junction of the plates 1-4 in the area of the openings 5, 6 and 7.

Figure 4:
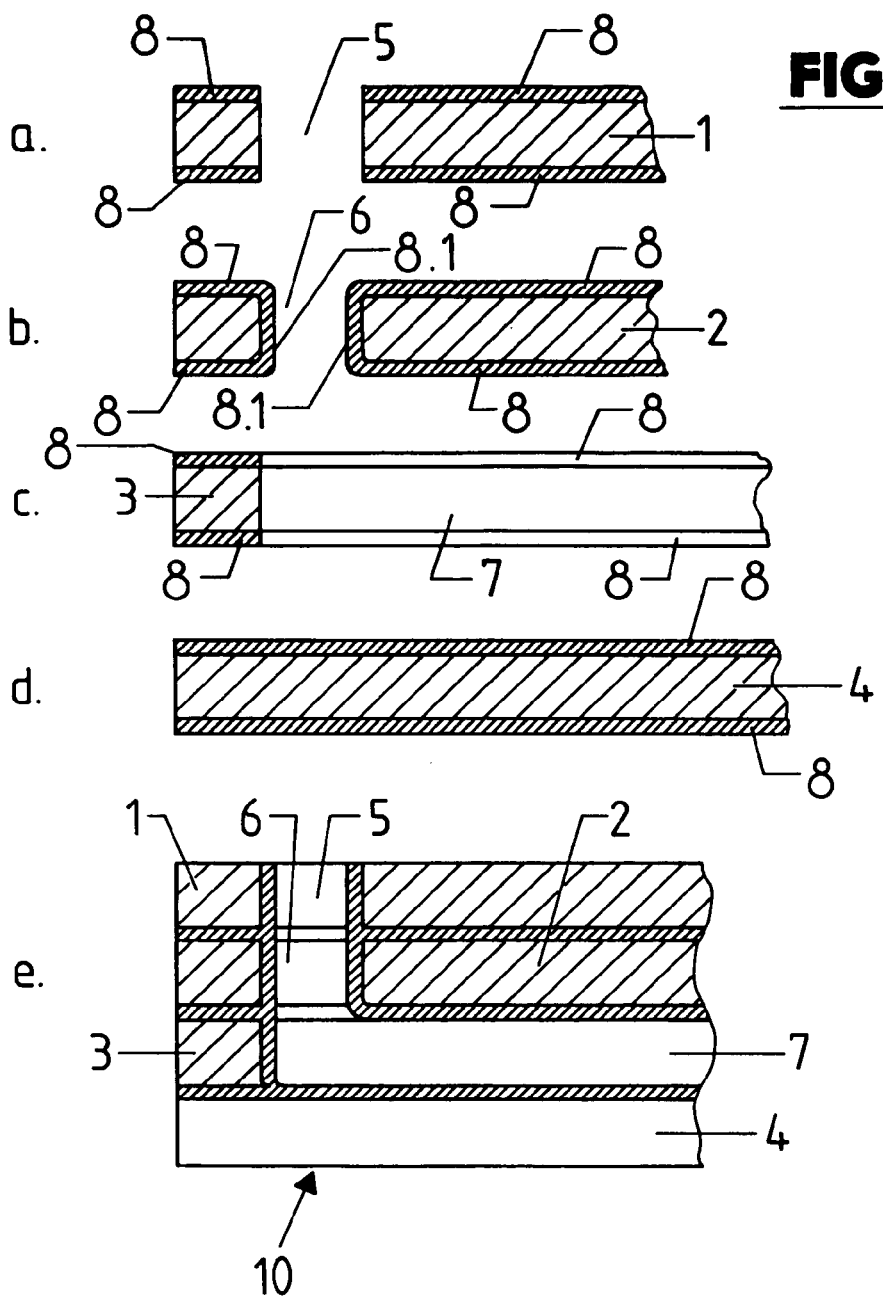
FIG. 4 shows a depiction as in FIG. 3, however of a further possible embodiment.

FIG. 4 shows in a depiction similar to FIG. 3, a further possible embodiment of the invention. In this embodiment, only the passages or openings 6 of the plate 2 are provided on their inner surfaces with the coating 8.1 made from the bonding means, while the plates 1, 3 and 4 have the bonding means only on their joining surfaces. Nevertheless, with a sufficient thickness of the coating 8.1 in the area of the openings 6, i.e. with a sufficient volume of bonding means during joining, sufficient covering at least at the junction to the adjoining openings 5 and 7 with the material of the joining or bonding layer formed by the bonding means is achieved, so that the formation of the disadvantageous dead spaces 9 is eliminated and the edges or margins of the adjoining openings 5 and 7 are covered with the material of the bonding layer.

It was assumed above in connection with FIG. 4 that all plates 1-4 are provided with the bonding means or with the coating 8 at least on their joining surfaces, while the bonding means (coating 8.1) is applied to at least one plate 1-3 also on the inner or side surfaces of the passages or openings there. Generally it is also possible, however, that only one of two adjoining plates in the stack or cooler 10 is provided with the bonding means on its surface sides and also on the inner or side surfaces of its passages or openings, while the adjoining plate has no bonding means whatsoever. It is possible, for example, in deviation from the embodiment described in connection with FIG. 4, to provided the plate 1 with the bonding means at least on its surface side to be joined with the plate 2 and on the inner surfaces of the openings 5 and the plate 3 on its two surface sides and on the inner surfaces of the openings 7, while the plates 2 and 4 are not provided with bonding means. During joining of the plates 1-4, the joining of all plates to form the cooler 10 is achieved by the bonding means on the plates 1 and 3, and in addition the junctions between the individual plates in the area of the openings 5-7 are covered so that the unwanted dead spaces 9 are eliminated.

In a similar manner it is possible to provide only the plate 2 with the bonding means on its two surface sides and on the inner surfaces of the openings 6 and the plate 4 at least on its surface side to be joined with the plate 3, while the plates 1 and 3 are not provided with the bonding means. During joining, the junctions between the individual plates are covered with the fusible metal in the area of the openings 5-7 so that the unwanted dead spaces 9 are eliminated.

Further variants of this method are conceivable, for example in the form that only the inner surfaces of the openings 5 and 7 are provided with the application 8.1 of the bonding means, while the inner surfaces of the openings 6 are kept free from the bonding means, etc.

Figure 5:
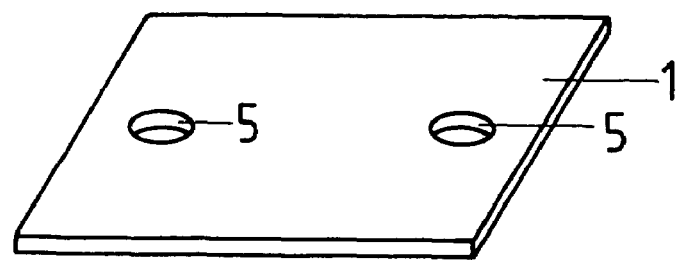
FIG. 5 shows in a depiction similar to FIG. 1 five layers or plates for manufacturing a cooler of a further possible embodiment.
Figure 5:
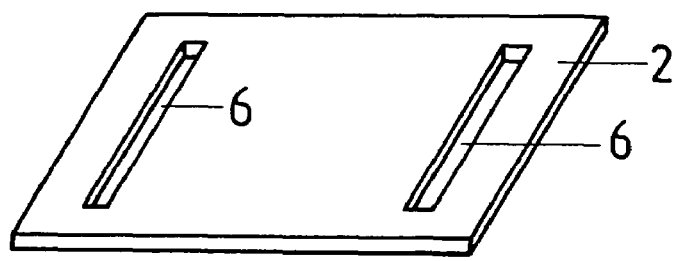
Figure 5:
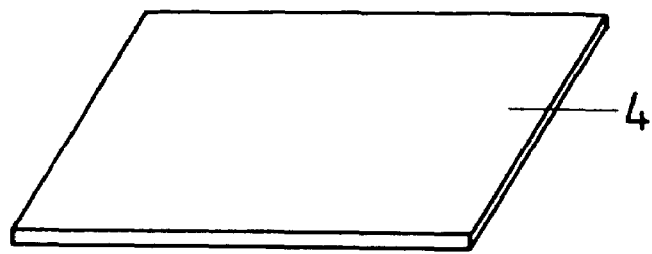

FIG. 5 shows in a depiction similar to FIG. 1 the plates to be joined to form a plate stack or a cooler 10a. This embodiment makes use of a total of five plates, namely plates 1-4 and an additional plate 2 between the plates 3 and 4, whereby the plates in the depicted embodiment are likewise formed from quadratic blanks of the same size from a metal foil, for example a copper foil. The surface joining or bonding of the plates 1-4 to form the plate stack or cooler 10a takes place using the bonding means and by heating to the process temperature. In the cooler 10a the passages or openings 6 in the two plates 2 form distribution channels with an enlarged diameter and the passages or openings 7 in the plate 3 form a plurality of cooling channels extending between these distribution channels. The cooler 10a is closed on both sides by the plates 1 and 4, whereby the openings 5 form outer connections connected with the distribution channels formed by the openings 6 and for this purpose are provided, for example, with tubular connecting elements not depicted.

Also in this method, the bonding means is applied not only to the surface sides or joining surfaces of the plates 1-4 to be bonded with each other, but at least on some of the plates to the inner surface of the passages or openings provided in these plates. Examples of this are reproduced in FIGS. 6 and 7.

Figure 6:
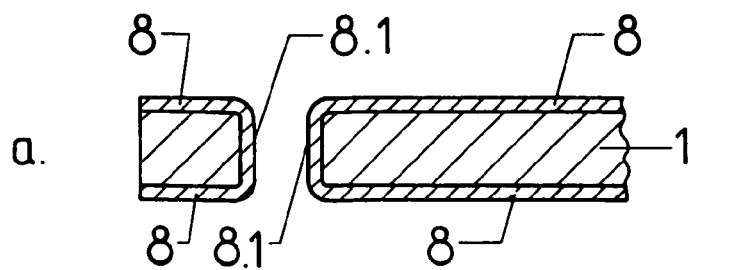
FIG. 6 shows in each of the positions a-e, a partial cross section of the plates of FIG. 5 before bonding to form the micro-cooler and in position f, a partial cross section through the cooler formed by the plates.
Figure 6:
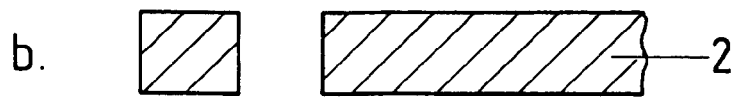
Figure 6:
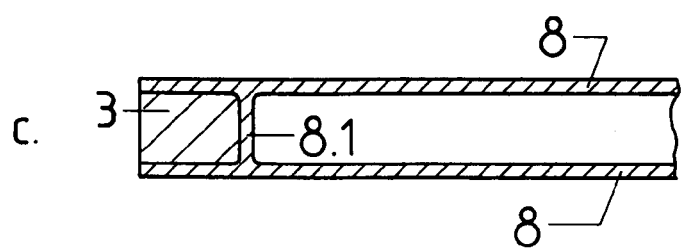
Figure 6:
Figure 6:
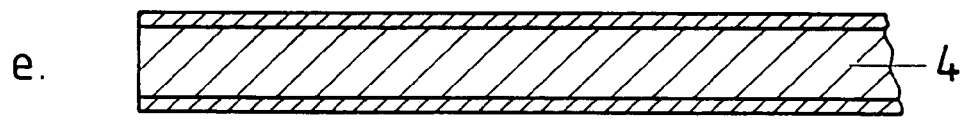
Figure 6:
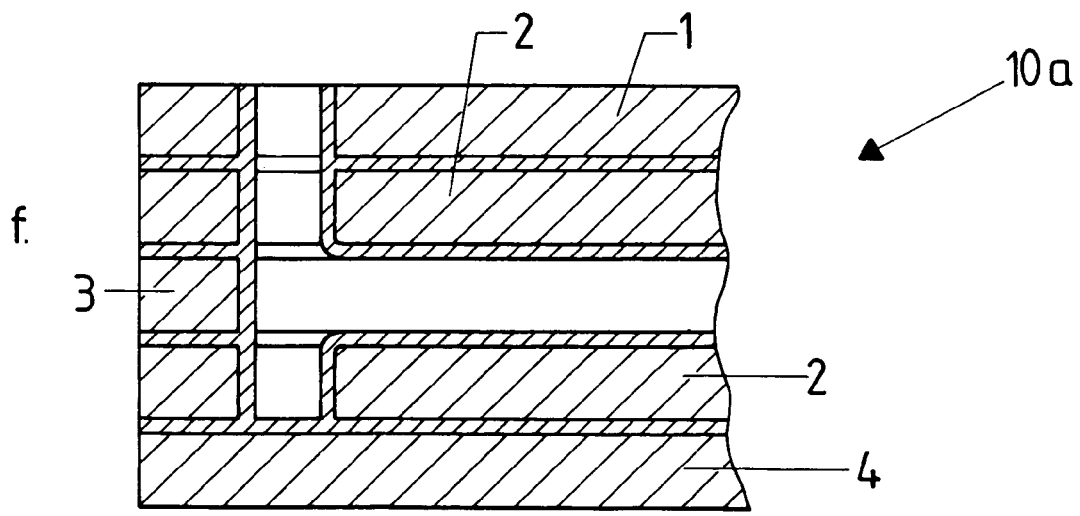

In the embodiment depicted in FIG. 6, before joining of the plates 1-4 to form the cooler 10a, only every second plate is provided with the bonding means on its surface sides and on the inner surfaces of its openings, namely the plates 1, 3 and 4 as depicted in the positions a, c and e with the coatings 8 and 8.1. During joining or bonding, the fusible or meltable metal produced using the bonding means covers the junction of all adjoining plates 1-4 in the area of the openings 5, 6 and 7 so that the disadvantageous dead spaces 9 are eliminated and also the margins of the openings and the inner surfaces of the openings at the junctions between the plates 1-4 are covered with the metal of the bonding layer.

Figure 7:
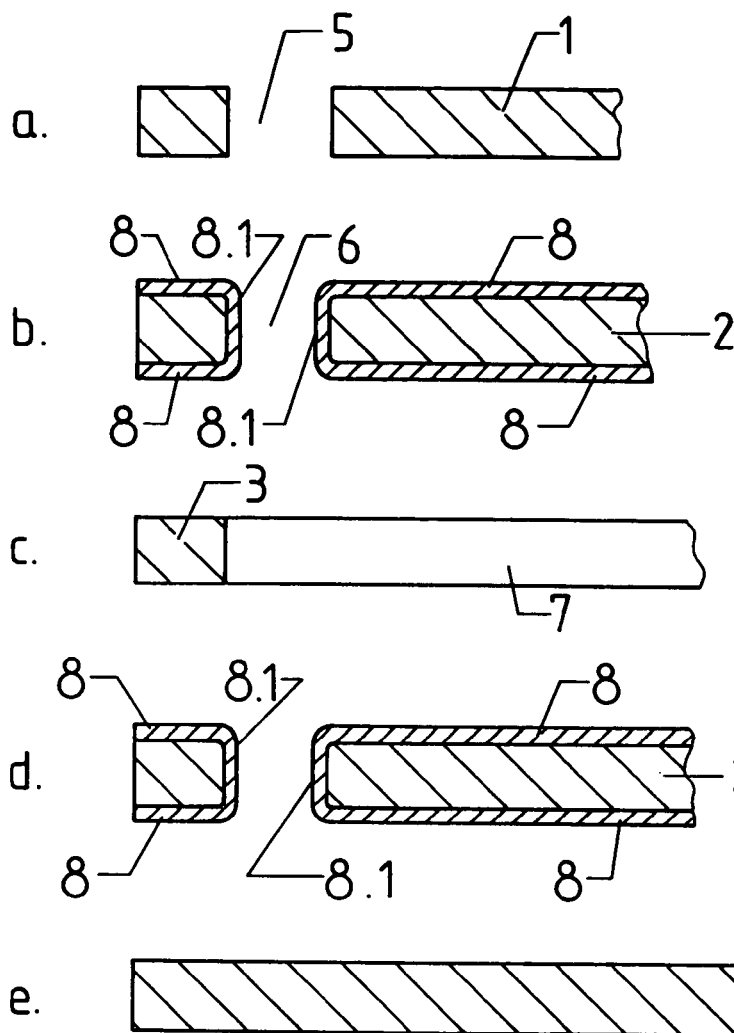
FIG. 7 shows a depiction similar to FIG. 6.
Figure 7:
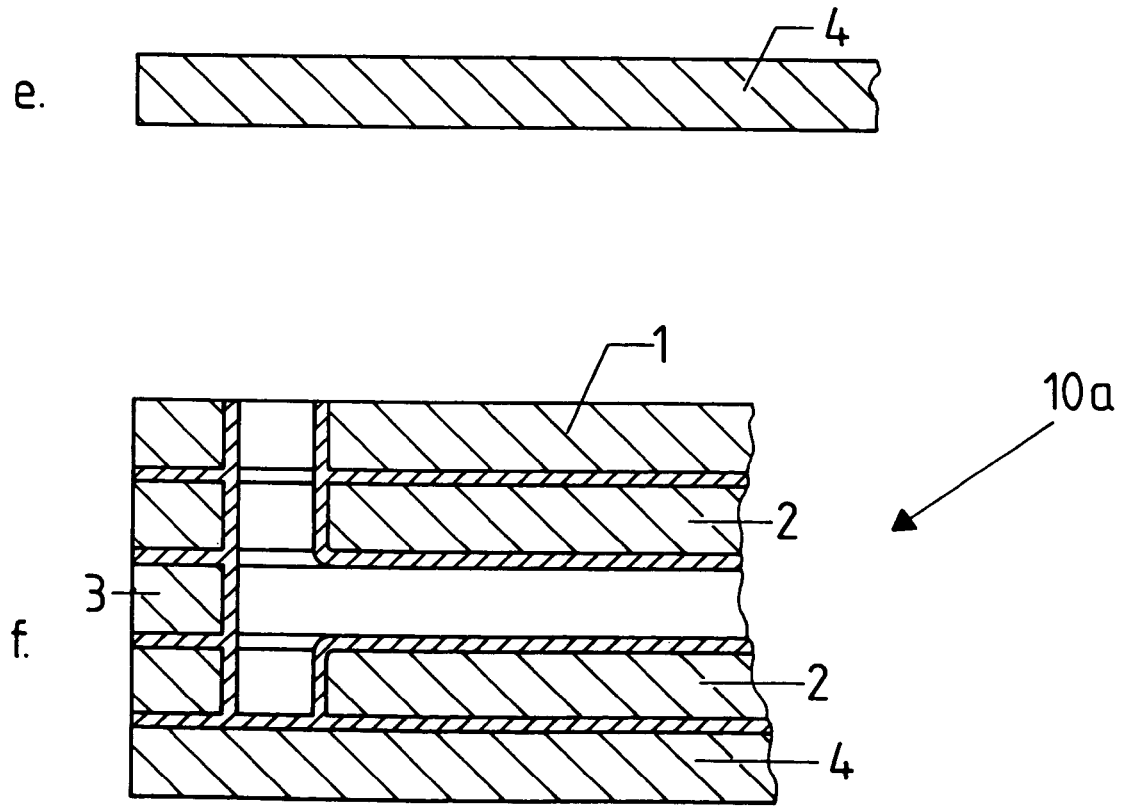

The same result can also be achieved corresponding to the embodiment depicted in FIG. 7 in that only the two plates 2 are provided with the bonding means (coating 8) on the surface sides and with the bonding means (coating 8.1) in the openings 6. In this embodiment, the fusible metal during bonding also covers the junction between all plates 1-4 in the area of the openings 5-7 and also the inner surfaces of these openings, so that the unwanted dead spaces 9 are eliminated.

The bonding means can be applied in a wide variety of manners, e.g. also depending on the type of bonding means and therefore depending on the type of the bonding method. If, for example, a direct bonding process is used, e.g. if the plates 1-4 are made of copper, for example, a direct copper bonding process is used, then the bonding means is a bond between the respective metal of the plates with a reactive gas, i.e. for plates made of copper $CuO$ and/or $Cu_2O$ as a bonding means, whereby the joining or bonding then takes place by heating the plates 1-4 arranged one above the other in a stack in an inert gas atmosphere with a low oxygen content to a process temperature between 1065° C. and 1082° C. and then cooling to the ambient temperature.

The application of the bonding means takes place, for example, by a suitable chemical treatment of the plates 1-4 or foil blanks. For such plates, which also have the bonding means on the inner surfaces of their openings, this chemical treatment for forming the bonding means layer, i.e. for example the CuO and/or Cu$_2$O coating does not take place until after the structuring or creation of the openings.

Various metals or metal alloys are suitable for the bonding means, particularly also such metals or metal alloys that form a solder with the metal of the plates 1-4 at the process temperature, the melting temperature of which (solder) is considerably below the melting temperature of the metal of the plates 1-4.

A suitable bonding means, for example, is a Ni—P alloy, with a phosphorous content between 1 and 20 percent in weight. The joining or bonding of the stacked plates 1-4 takes place by heating the plate stack to a process temperature between 850° C. and 1082° C. and cooling to the ambient temperature, whereby the bonding means forms a fusible solder with the adjoining copper of the plates 1-4 at the process temperature.

Silver is a suitable bonding means especially for plates 1-4 made of copper, whereby the bonding takes place by heating to a process temperature between 780° C. and 1080° C.

Tin or tin alloys are also suitable bonding means, for example. The joining or bonding of the stacked plates 1-4 takes place by heating the plate stack to a process temperature between approximately 170° C. and 280° C.

The application of the bonding means is achieved chemically, for example, by means of electroplating or immersion.

If the plates have a thickness between 0.1 and 2 mm, a sufficient bonding means coating 8.1 on the inner surfaces of the openings has a thickness of approximately 0.5 to 1.5 µm.

Figure 8:
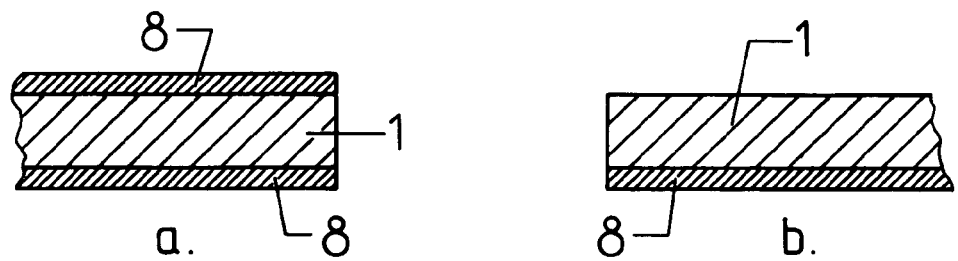
FIG. 8 shows in positions a and b two process steps of a further possible embodiment of the invention.

Especially with the method described above for applying the bonding means by chemical or galvanic treatment of the respective plates 1-4, it generally cannot be avoided that the bonding means is deposited not only as a coating 8.1 in the area of the respective openings, but also as a coating 8 on both surface sides of the respective plate. If the latter is unwanted, i.e. if only one of the two surface sides of one plate should be provided with the bonding means, then the respective plate is subjected to further treatment after application of the bonding means and before bonding, as depicted in FIG. 8. Position a there shows a plate, for example the plate 1, which is provided on both surface sides with the coating 8 made of the bonding means and in the area of the openings 6 with the coating 8.1 made of the bonding means. In a further process step, for example by means of a mechanical or chemical treatment, the bonding means is then removed on one surface side, so that the plate is provided with the bonding means only on its other surface side and in the area of the openings 5.

The general advantage of the invention is the fact that in all of the embodiments described above, the disadvantageous dead spaces of the known art at the junctions between the plates or plates 1-4 in the area of the passages or openings are eliminated, particularly preventing unwanted turbulence in the coolant. Furthermore, the complete covering of the junctions between the plates 1-4 at the passages or openings with the fusible metal during bonding also means that in the finished stack, the same material is everywhere on the surface, preventing contact corrosion resulting from contact of other material with the liquid coolant (e.g. water).

The embodiments described in connection with FIGS. 5 and 7 have the advantage that bonding means must be applied to only some of the plates 1-4 before bonding, resulting in a reduction of the manufacturing and processing costs. Surprisingly, also in these embodiments, the junctions between the individual plates in the area of their passages or openings are completely covered with the fusible metal formed by the bonding means, so that not only the unwanted dead spaces 9 of the art are eliminated, but also, at least in the area of the openings, the surface of the channels through which the coolant flows are formed from the same material and cold corrosion is avoided at least to the greatest possible extent.

The invention was described above base on exemplary embodiments. It goes without saying that various modifications and variations are possible without abandoning the underlying inventive idea upon which the invention is based.

REFERENCE LIST

1, 2, 3, 4 plate or plate-shaped element
5, 6, 7 passage or opening
8 bonding means coating or application on the surface sides
8.1 bonding means coating or application on the openings
9 dead space
10, 10*a* cooler

What is claimed is:

1. A method for manufacturing plate stacks, particularly for manufacturing coolers or cooler elements or heat sinks comprising at least one plate stack, with at least two plate-shaped elements made of copper, and provided with passages or openings, wherein the at least two plate-shaped elements are bonded with each other using a bonding means on joining surfaces formed by surface sides of said elements by means of heating to a process temperature to form the at least one plate stack, wherein before bonding, the bonding means is applied to inner surfaces of the passages or openings, wherein CuO and/or Cu$_2$O is used as the bonding means, and that the bonding takes place at a process temperature between 1065° C. and 1082° C.

2. A method for manufacturing plate stacks, with at least two plate-shaped elements made of metal, and provided with passages or openings, wherein the at least two plate-shaped elements are bonded with each other using a bonding means on joining surfaces formed by surface sides of said elements by means of heating to a process temperature to form the at least one plate stack, wherein before bonding, the bonding means is applied to inner surfaces of the passages or openings wherein before bonding, only some of the elements are provided with the bonding means at their joining surfaces, and on their existing passages or openings,
  wherein tin or a tin alloy is used as the bonding means, and that the bonding takes place at a process temperature between approximately 170° C. and 280° C.

3. The method according to claim 1, wherein CuO and/or Cu$_2$O is applied as a bonding means on joining surfaces and on inner surfaces of the openings and that the elements are stacked and joined with each other by heating to a process temperature between 1065° C. and 1082° C.

4. The method according to claim 2, wherein tin or tin alloy is applied as a bonding means to joining surfaces of the elements and/or to inner surfaces of the openings, and that the elements are stacked and joined with each other at the process temperature between 170° C. and 280° C.).

5. The method according to claim 1, wherein the bonding means is applied to such openings extending through a plate-shaped element.

* * * * *